United States Patent
Ebisuoka

(10) Patent No.: US 8,424,950 B2
(45) Date of Patent: Apr. 23, 2013

(54) VEHICLE SUN VISOR

(75) Inventor: Norio Ebisuoka, Nagoya (JP)

(73) Assignee: Kyowa Sangyo Co., Ltd., Toyota (JP)

( * ) Notice: Subject to any disclaimer, the term of this patent is extended or adjusted under 35 U.S.C. 154(b) by 113 days.

(21) Appl. No.: 13/089,747

(22) Filed: Apr. 19, 2011

(65) Prior Publication Data

US 2011/0260491 A1   Oct. 27, 2011

(30) Foreign Application Priority Data

Apr. 23, 2010   (JP) .................... 2010-100366

(51) Int. Cl.
*B60J 3/02*   (2006.01)

(52) U.S. Cl.
USPC .... 296/97.1; 296/97.9; 296/97.12; 296/97.13

(58) Field of Classification Search ............... 296/97.1, 296/97.5, 97.9, 97.12, 97.13
See application file for complete search history.

(56) References Cited

U.S. PATENT DOCUMENTS

| | | | |
|---|---|---|---|
| 5,143,678 A | 9/1992 | Prillard | |
| 5,486,033 A * | 1/1996 | Lecorvaisier et al. | ..... 296/97.13 |
| 6,368,114 B1 * | 4/2002 | Inoue | ............................ 439/34 |
| 6,428,077 B1 * | 8/2002 | Sawayanagi | ................ 296/97.9 |
| 6,428,193 B1 * | 8/2002 | Guyot | ........................ 362/492 |
| 6,676,129 B2 | 1/2004 | Wilson | |
| 7,108,309 B2 | 9/2006 | Garcia | |
| 7,234,751 B2 | 6/2007 | Umemura | |
| 2011/0260491 A1* | 10/2011 | Ebisuoka | .................... 296/97.5 |

* cited by examiner

*Primary Examiner* — Glenn Dayoan
*Assistant Examiner* — Gregory Blankenship
(74) *Attorney, Agent, or Firm* — Oliff & Berridge, PLC

(57) ABSTRACT

A vehicle sun visor includes: a sun visor body; a support shaft that supports the sun visor body; a mounting bracket that attaches the support shaft to a vehicle; a pair of first conductive element and second conductive element that are provided at a shaft end of the support shaft adjacent to the mounting bracket and inside the support shaft; a divider that is interposed between first ends; and a pair of terminals that supply electric power to the first ends. A gap is formed between the divider and at least one of the first ends.

6 Claims, 4 Drawing Sheets

VEHICLE SUN VISOR

INCORPORATION BY REFERENCE

The disclosure of Japanese Patent Application No. 2010-100366 filed on Apr. 23, 2010 including the specification, drawings and abstract is incorporated herein by reference in its entirety.

BACKGROUND OF THE INVENTION

1. Field of the Invention

The invention relates to a vehicle sun visor.

2. Description of Related Art

Conventionally, a vehicle sun visor includes a structure that supplies electric power to an electrical device provided in a sun visor body. For example, U.S. Pat. No. 7,108,309 describes a vehicle sun visor having such a structure. The vehicle sun visor includes conductive elements in a support shaft that rotatably supports the sun visor body. Electric power may be supplied to an electrical device provided at the sun visor body via the conductive elements. Specifically, the pair of conductive elements are exposed on the sides of the support shaft near one end of the shaft, and are urged by an elastic urging force of vehicle-side terminals to clamp the pair of conductive elements from the outer sides. The relative position of the conductive elements with respect to the terminals changes when the support shaft is rotated to thereby switch between an energized state, in which the terminals are electrically connected to the conductive elements, and a non-energized state, in which the conductive state is terminated.

SUMMARY OF THE INVENTION

When a vehicle sun visor is designed, there is a need for improving a connection structure between vehicle-side terminals and support shaft-side conductive elements. For example, the vehicle sun visor described in U.S. Pat. No. 7,108,309 may possibly prevent a short circuit of the pair of conductive elements in such a manner that portions of the shaft end of the support shaft, interposed between the pair of conductive elements, inhibit contact between the terminals and the pair of conductive elements in the de-energized state. However, irrespective of the change of the relative position between the terminals and the conductive elements with the rotation of the support shaft, the terminals are constantly in contact with the shaft end of the support shaft at a constant contact pressure, so there is a concern about a decrease in clamping force of the terminals against the conductive elements due to long-term usage.

The invention provides a vehicle sun visor and that, in terms of a structure that a pair of conductive elements provided at a support shaft that supports a sun visor body are in contact with vehicle-side terminals, is able to ensure the durability of the vehicle-side terminals while reliably preventing a short circuit of the pair of conductive elements.

The invention provides a technique that can be applied to various vehicle sun visors having a structure that portions of a pair of conductive elements provided at a support shaft that supports a sun visor body contact vehicle-side terminals.

A vehicle sun visor according to an aspect of the invention is a sun visor that is installed near an upper portion of a front windshield of a vehicle. The vehicle sun visor at least includes a sun visor body, a support shaft, a mounting bracket, a first conductive element and a second conductive element, a divider, and a pair of terminals. The support shaft has a shaft end. Each of the first conductive element and the second conductive element respectively has a first end. A gap is formed between the divider and at least one of the first end of the first conductive element and the first end of the second conductive element.

The support shaft is non-conductive and supports the sun visor body. The mounting bracket functions as a bracket for attaching the support shaft to a vehicle. The first conductive element and the second conductive element are conductive elements (conductive members) that are provided inside the support shaft and that extend in a direction in which the support shaft extends. The first ends of the respective first conductive element and second conductive element protrude from, the shaft end of the support shaft. The first ends of the first conductive element and the second conductive element are spaced apart from each other and extend in a same direction in which the support shaft extends. These first ends may be provided at an end surface of the shaft end of the support shaft or may be provided at an outer peripheral surface of the shaft end of the support shaft. The divider is non-conductive and is interposed between the first ends of the first conductive element and second conductive element. The divider may be formed integrally with the support shaft or may be formed separately from the support shaft and attached to the support shaft.

In the above configuration, the support shaft includes a first segment and a second segment. The second segment of the support shaft is rotatable around the axis of the first segment. When the support shaft is rotated to a first position, the first end of the first conductive element and the first end of the second conductive element each contact a corresponding terminal for supplying electric power and the first conductive element and the second conductive element are energized. On the other hand, when the support shaft is rotated to a second position (position different from the first position), the divider contacts the terminals so that the first conductive element and the second conductive element are de-energized and the first ends of the first conductive element and the second conductive element are inhibited from contacting the terminals. The first position of the support shaft may be a front position located adjacent to the front windshield of the vehicle. In addition, the second position of the support shaft may be typically a side position located along a side window of the vehicle. Accordingly, when the support shaft is set in the second position, the divider prevents a short circuit from occurring between the first conductive element and second conductive element. The terminals for supplying electric power may be formed as separate components from the vehicle sun visor or may be formed as part of the vehicle sun visor.

In addition, the gap prevents a portion other than the divider from contacting the terminals with excessive force when the second segment of the support shaft is rotated around the axis of the first segment. Accordingly, the gap is able to decrease contact pressure applied to the terminals when the second segment of the support shaft is rotated around the axis of the first segment within a predetermined angular range. With the above configuration, it is possible to suppress a decrease in clamping force of the terminals against the first ends of the first conductive element and second conductive element due to long-term usage, so the durability of the terminals may be ensured. In addition, a portion other than the divider may be omitted owing to the gap, so it is possible to reduce the weight and cost of a product.

In addition, in the vehicle sun visor according to the above aspect, the first ends of the first conductive element and second conductive element may extend from an end surface of the shaft end in the direction in which the first segment of the support shaft extends so as to be parallel to each other, and the divider may extend from the end surface of the first segment of the support shaft in the direction in which the shaft end extends. With the above configuration, the first conductive element and the second conductive element that are provided inside the support shaft may be directly extended in a straight line from the end surface of the shaft end of the support shaft to respectively form the first ends of the first conductive element and second conductive element. Thus, the overall structure of the vehicle sun visor may be effectively simplified In addition, in the vehicle sun visor according to the above aspect, the divider may be a plate or a pin. The rod widely may be a shape having a triangular, polygonal, circular, or elliptical cross section. Thus, the divider may have a simple shape.

As described above, the vehicle sun visor and that, in terms of a structure that a pair of conductive elements provided at a support shaft that supports a sun visor body are in contact with vehicle-side terminals, is able to ensure the durability of the vehicle-side terminals while reliably preventing a short circuit of the pair of conductive elements.

BRIEF DESCRIPTION OF THE DRAWINGS

Features, advantages, and technical and industrial significance of example embodiments of the invention will be described below with reference to the accompanying drawings in which like numerals denote like elements, and wherein.

DETAILED DESCRIPTION OF EMBODIMENTS

Figure 1:
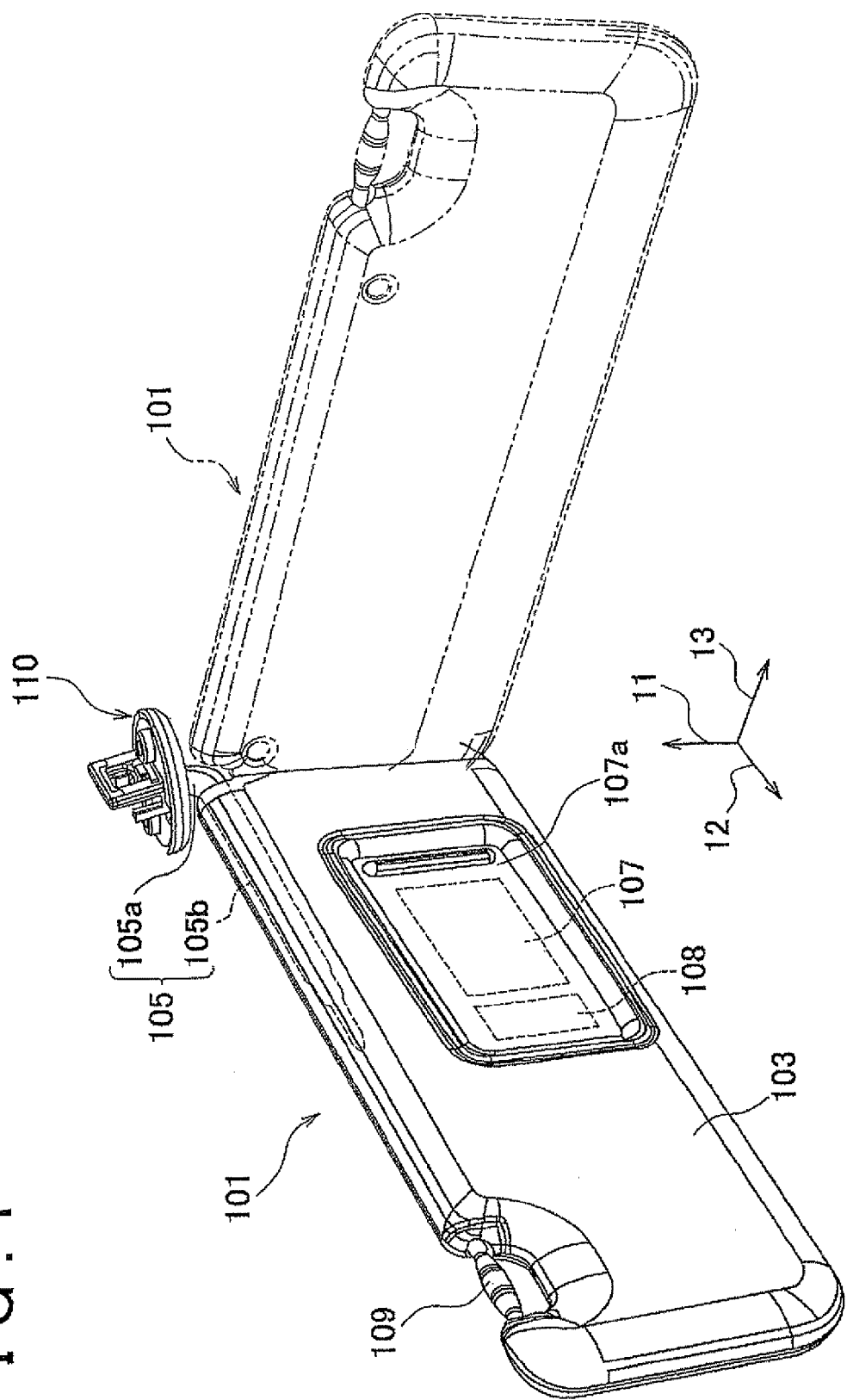
FIG. 1 is a perspective view that shows the overall configuration of a vehicle sun visor 101 according to an embodiment of the invention, and shows the vehicle sun visor 101 when in a front orientation and in a side orientation.

A vehicle sun visor according to a first embodiment of the invention will be described in detail below with reference to the accompanying drawings. FIG. 1 shows a perspective view of the overall configuration of a vehicle sun visor 101 according to the present embodiment.

The vehicle sun visor 101 is installed near the upper portion of a front windshield of a vehicle. As shown in FIG. 1, the vehicle sun visor 101 includes a sun visor body 103, a support shaft 105 and a mounting bracket 110. The support shaft 105 rotatably supports the sun visor body 103. The mounting bracket 110 is provided at an one end of the support shaft 105. The mounting bracket 110 is used to attach the support shaft 105 to the vehicle.

The sun visor body 103 is formed of a core, two cushion pads and a covering. The core is made of a hard material, and is substantially rectangular. The two cushion pads sandwich the core, and are bonded to each other. The covering covers both cushion pads. In addition, a vanity mirror 107 and a minor cover 107a are provided on one side of the assembled sun visor body 103. The vanity mirror 107 is switchable between a covered state where the vanity mirror 107 is covered with the mirror cover 107a and an uncovered state where the vanity mirror 107 is not covered with the minor cover 107a. A lamp 108 for the vanity minor 107 may be provided near the vanity mirror 107. The lamp 108 turns on or of as the vanity mirror 107 switches between the covered state where the vanity minor 107 is covered and the uncovered state where the vanity mirror 107 is not covered.

The support shaft 105 has a first segment 105a and a second segment 105b, and is substantially L-shaped. When the vehicle sun visor 101 is fastened to the vehicle, the first segment 105a extends in a straight line in a substantially vertical direction (arrow 11 direction in FIG. 1). The second segment 105b is formed integrally with the first segment 105a, and extends in a straight line in a substantially horizontal direction (arrow 12 direction in FIG. 1) perpendicular to the vertical direction. Each of the first segment 105a and second segment 105b of the support shaft 105 has a circular cross-section.

The first segment 105a is shorter than the second segment 105b. Therefore, the first segment 105a may also be referred to as the short shaft segment. The first segment 105a is pivotably fastened to the front corner of the ceiling of the vehicle cabin via the mounting bracket 110. In other words, the vehicle sun visor 101 according to the embodiment shown in FIG. 1 is pivotably fastened to the right corner of the ceiling of the vehicle cabin. In contrast, the second segment 105b is longer than the first segment 105a. Therefore, the second segment 105b may also be referred to as the long shaft segment. The sun visor body 103 is pivotably attached at its the upper edge to the second segment 105b.

After the vehicle sun visor 101 is fastened to the ceiling of the vehicle cabin, it may be placed in either a storage position or a lowered position by pivoting the sun visor body 103 around the axis of the second segment 105b. In the storage position, the sun visor body 103 is oriented along the ceiling surface of the vehicle cabin. While in the lowered position, the sun visor body 103 is oriented along the front windshield of the vehicle. A support shaft 109 is provided on the far side of the sun visor body 103 from the first segment 105a. The support shaft 109 engages a hook (not shown in the drawing) fastened to the ceiling surface of the vehicle cabin and is pivotably held by the hook. The support shaft 109 held by the hook stabilizes the pivoting motion of the sun visor body 103 when the position of the sun visor body 103 is changed from the storage position to the lowered position or when the sun visor body 103 is changed from the lowered position to the storage position.

In addition, the position of the vehicle sun visor 101 may be changed between a front position (position indicated by the solid line in FIG. 1) located adjacent to the front windshield of the vehicle and a side position (position indicated by the alternate long and two short dashes line in FIG. 1) located along a side window of the vehicle in such a manner that the sun visor body 103 together with the second segment 105b is pivoted around the first segment 105a with the support shaft 109 of the sun visor body 103 is released from the hook. The front position and the side position respectively correspond to a first position and a second position.

Figure 2:
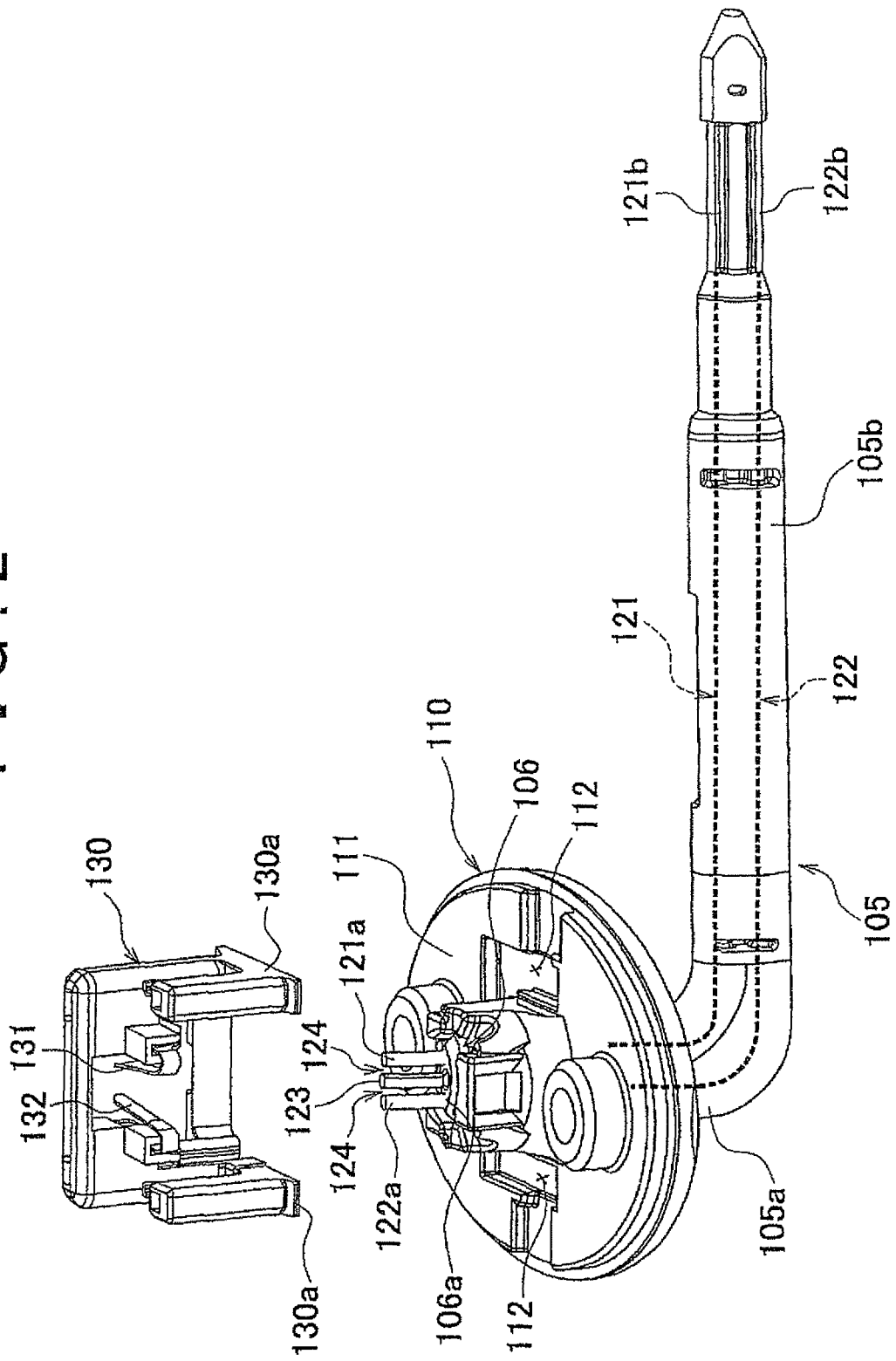
FIG. 2 is a perspective view of the area around a mounting bracket 110.

Here, specific structures of the above-described support shaft 105 and mounting bracket 110 are illustrated in FIG. 2, which shows the perspective view of the area around the mounting bracket 110 in FIG. 1. Note that, for the sake of convenience of description, in the vehicle sun visor 101 according to the present embodiment, it is assumed that, when the vehicle sun visor 101 is fastened to the vehicle, a first direction (arrow 11 direction in FIG. 1) in which the first segment 105a of the support shaft 105 extends is a vertical direction, a second direction (arrow 12 direction in FIG. 1) in which the second segment 105b of the support shaft 105 extends is a transverse direction and a third direction (arrow 13 direction in FIG. 1) that is perpendicular to the first direction and the second direction is a longitudinal direction.

As shown in FIG. 2, the mounting bracket 110 extends along a plane perpendicular to the first direction. The mounting bracket 110 is disc shaped. A connector 130 is connected to a surface of the mounting bracket 110, facing the ceiling surface of the vehicle cabin (not shown), that is, a bracket upper surface 111, which is formed on the opposite side of the mounting bracket 110 from the second segment 105b. The connector 130 is attached to the mounting bracket 110 via engaging portions 112 provided on the bracket upper surface 111 of the mounting bracket 110. Each engaging portions 112 is formed as a recess at which projected lower regions 130a of the connector 130 engage the engaging portions 112. Thus, the mounting bracket 110 is connected to the connector 130 in such a manner that the lower regions 130a of the connector 130 are engaged with the engaging portions 112 of the mounting bracket 110.

The support shaft 105 is, for example, made of a non-conductive material, such as a plastic material or a resin material. One shaft end 106 (i.e., the shaft end adjacent to the first segment 105a or adjacent to the mounting bracket 110) of the support shaft 105 extends from the bracket upper surface 111 of the mounting bracket 110. A pair of (two) metallic conductive elements 121 and 122 is incorporated in the support shaft 105. Typically, the conductive elements 121 and 122 are set in an injection molding die so that the conductive elements 121 and 122 are spaced apart from each other and then a plastic material is injected to form the support shaft 105. The conductive elements 121 and 122 (current-carrying elements) are directly coated with the non-conductive material of the support shaft 105.

The first conductive element 121 extends parallel to the second conductive element 122 though the inside of the first segment 105a of the support shaft 105 and the inside of the second segment 105b of the support shaft 105. Each of the first conductive element 121 and the second conductive element 122 may have a circular cross-sectional shape, a triangular cross-sectional shape, a polygonal cross-sectional shape, an elliptical cross-sectional shape, and so forth. When the vehicle sun visor 101 is fastened to the vehicle, both first ends 121a and 122a of these first conductive element 121 and second conductive element 122 protrude (are exposed) outward from the support shaft 105 on an end surface 106a that faces the connector 130, of the shaft end 106 adjacent to the first segment 105a (mounting bracket 110) of the support shaft 105.

Specifically, the first ends 121a and 122a extend from the end surface 106a of the shaft end 106 in the first direction so as to be parallel to each other and are spaced apart from each other. Accordingly, the first conductive element 121 and the second conductive element 122 provided inside the support shaft 105 may be directly extended in a straight line from the end surface 106a to respectively form the first ends 121a and 122a. Thus, the overall structure of the vehicle sun visor 101 may be effectively simplified. However the second ends 121b and 122b of both the first conductive element 121 and second conductive element 122, which are located adjacent to the second segment 105b, extend in the second direction.

A single divider 123 is provided between the first end 121a of the first conductive element 121 and the first end 122a of the second conductive element 122. The divider 123 extends parallel to these first ends 121a and 122a and is interposed between these first ends 121a and 122a. The divider 123 is non-conductive and is made of a non-conductive material similar to that of the support shaft 105. In addition, a gap 124 is formed between the divider 123 and the first end 121a of the first conductive element 121. Another gap 124 is formed between the divider 123 and the first end 122a of the second conductive element 122. The divider 123 may be formed integrally with the support shaft 105 or may be formed separately from the support shaft 105 and attached to the shaft end 106 of the support shaft 105.

When the mounting bracket 110 is connected to the connector 130, the first ends 121a and 122a of the conductive elements 121 and 122 are located opposite a pair of metallic terminals (contacts) 131 and 132 of the connector 130. Power from a vehicle-side power supply source is supplied through the terminals 131 and 132, which are connected to the vehicle-side power supply source. In addition, both of the terminals 131 and 132 have leaf spring structures so that these terminals 131 and 132 are able to apply elastic forces toward the facing first ends 121a and 122a. Accordingly, the first ends 121a and 122a are urged and clamped from the outer sides by the elastic forces of the terminals 131 and 132. The terminals 131 and 132 may be formed as separate components from the vehicle sun visor 101 or may be formed as part of the vehicle sun visor 101.

In addition, when the support shaft 105 is pivoted around the axis of the first segment 105a to change the position of the sun visor body 103 between the front position and the side position, the relative position between the first ends 121a and 122a of the first conductive element 121 and second conductive element 122, respectively, and the terminals 131 and 132 of the connector 130 is changed. Due to the change in relative position between the first ends 121a and 122a and the terminals 131 and 132, the first conductive element 121 and the second conductive element 122 switch between the energized state and the de-energized state (also referred to as an non-energized state). Similarly, by pivoting the sun visor body 103 around the axis of the second segment 105b when the support shaft 109 of the sun visor body 103 is engaged with the vehicle-side hook, the position of the sun visor body 103 is changed between the storage position and the lowered position, which also switches the first conductive element 121 and the second conductive element 122 between the energized state and the de-energized state. Thus, both conductive elements are energized, so the lamp 108 is ready to turn on.

Figure 3:
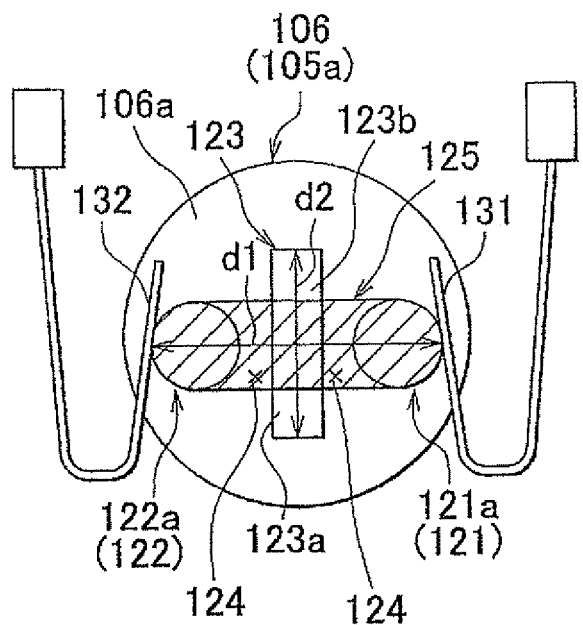
FIG. 3 is a schematic view of a first conductive element 121 and second conductive element 122 when energized.
Figure 4:
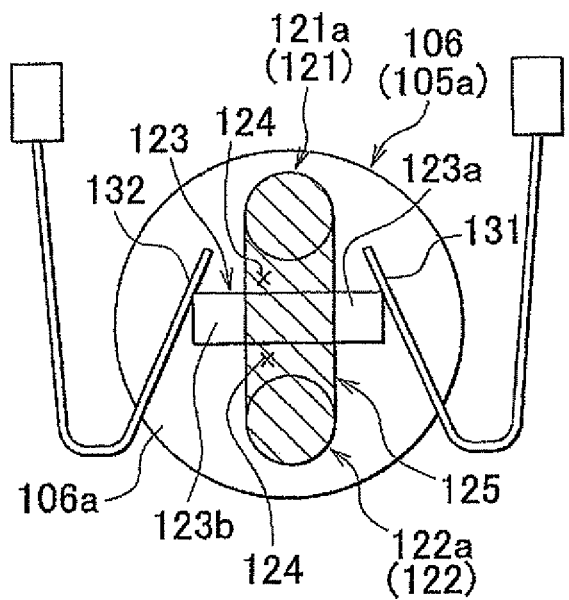
FIG. 4 is a schematic view of the first conductive element 121 and second conductive element 122 when de-energized.

Connection of the mounting bracket 110 to the connector 130 is illustrated in FIG. 3, which schematically shows the first conductive element 121 and second conductive element 122 when energized, and FIG. 4, which schematically shows the first conductive element 121 and second conductive element 122 when de-energized.

As shown in FIG. 3, the divider 123 according to the first embodiment is a plate. The divider 123 is interposed between the two first ends 121a and 122a. The divider 123 includes a pair of contact portions 123a and 123b that are arranged outside a partition region 125, in a plane that intersects with the direction in which the first segment 105a extends (In particular, in a plane substantially perpendicular to the direction in which the first segment 105a extends). The partition region 125 is defined by the two first ends 121a and 122a. The contact portions 123a and 123b are located outside the partition region 125 in a direction that intersects with the direction in which the first ends 121a and 122a are arranged. The contact portions 123a and 123b respectively contact the terminals 131 and 132 when de-energized. The partition region 125 is the diagonally shaded region in FIG. 3, and is defined as a region that includes regions occupied by the two first ends 121a and 122a and a region between these two first ends 121a and 122a. In other words, the partition region 125 is an obround region in which the two first ends 121a and 122a form the ends of the obround shape. Specifically, the partition region 125 has the obround shape as viewed along the shaft end 106 of the support shaft 105.

In addition, in the example shown in FIG. 3, where the coplanar distance between the outer edges of the two first ends 121a and 122a in the direction in which the first ends 121a and 122a are arranged is d1 and the length of the divider 123 in the direction that intersects with the direction in which the first ends 121a and 122a are arranged is d2, the relationship d1>d2 holds. In other words, the distance d1 is the length of the partition region 125, and the distance d2 is the length of the divider 123. Alternatively, when appropriate, the relationship may be d1≦d2 instead.

With the above configuration, when the relative position between the two first ends 121a and 122a and the two terminals 131 and 132 are set as shown in FIG. 3, that is, when the support shaft 105 is set in the front position, one first end 121a contacts one terminal 131, and the other first end 122a contacts the other terminal 132. Accordingly, the conductive elements 121 and 122 are energized (i.e., current is supplied from the vehicle side to the conductive elements 121 and 122 via the connector 130).

In contrast, when the relative position between the two first ends 121a and 122a and the two terminals 131 and 132 is set as shown in FIG. 4, that is, when the support shaft 105 is in the side position, the two terminals 131 and 132 are separated from the two first ends 121a and 122a and brought into contact with the divider 123. Thus, the first conductive element 121 and the second conductive element 122 are de-energized (i.e., the supply of current from the vehicle side to the first conductive element 121 or the second conductive element 122, via the connector 130, is interrupted). Accordingly, the divider 123 contacts the terminals 131 and 132 to thereby prevent the first ends 121a and 122a from contacting the terminals 131 and 132 when de-energized. That is, the divider 123 functions as a contact inhibiting portion. Accordingly, entry of the terminals 131 and 132 into the partition region 125 is restricted by the divider 123. Therefore, it is possible to reliably prevent a short circuit from occurring between the conductive elements 121 and 122. Thus, the divider 123 may also be referred to as a baffle or a baffle board that restricts entry of the terminals 131 and 132 into the partition region 125 when energized or a preventing portion or preventing plate that prevents entry of the terminals 131 and 132 into the partition region 125 when de-energized.

In addition, in the present embodiment, the divider 123 is arranged with the gaps 124 respectively from the first end 121a of the first conductive element 121 and the first end 122a of the second conductive element 122 as described above. The gaps 124 may prevent a portion other than the divider 123 from contacting the terminals 131 and 132 with excessive force when the support shaft 105 is rotated around the shaft end 106. Thus, it is possible to decrease contact pressure applied to the terminals 131 and 132 when the support shaft 105 is rotated around the shaft end 106 within a predetermined angular range. With the above configuration, it is possible to suppress a decrease in clamping force of the terminals 131 and 132 against the first ends 121a and 122a of the first conductive element 121 and second conductive element 122 due to long-term usage, so the durability of the terminals 131 and 132 may be ensured. In addition, a portion other than the divider 123 may be omitted owing to the gaps 124, so it is possible to reduce the weight and cost of a product. Furthermore, in the present embodiment, where the coplanar distance between the outer edges of the two first ends 121a and 122a in the direction in which the first ends 121a and 122a are arranged (the length of the partition region) is d1 and the length of the divider 123 in the direction that intersects with the direction in which the first ends 121a and 122a axe arranged is d2, the relationship d1>d2 holds. Accordingly, contact pressure applied to the terminals 131 and 132 when de-energized may be decreased.

Note that the invention is not only restricted to the above embodiment but modifications may be conceived on the basis of the first embodiment. For example, the second embodiment that is a modification of the first embodiment may be implemented.

In the first embodiment, the single plate is provided as the divider 123 between the first end 121a of the first conductive element 121 and the first end 122a of the second conductive element 122. However, the shape of the divider 123 may be implemented in various ways. For example, a plurality of portions that function similarly to the divider 123 may be provided instead of or in addition to the divider 123.

Figure 5:
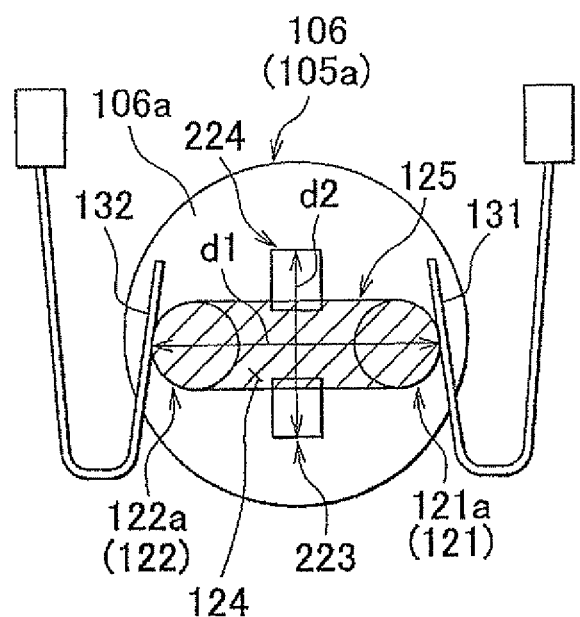
FIG. 5 is a schematic view of the first conductive element 121 and second conductive element 122 when energized, and the dividers 223 and 234 are used instead of a divider 123.
Figure 6:
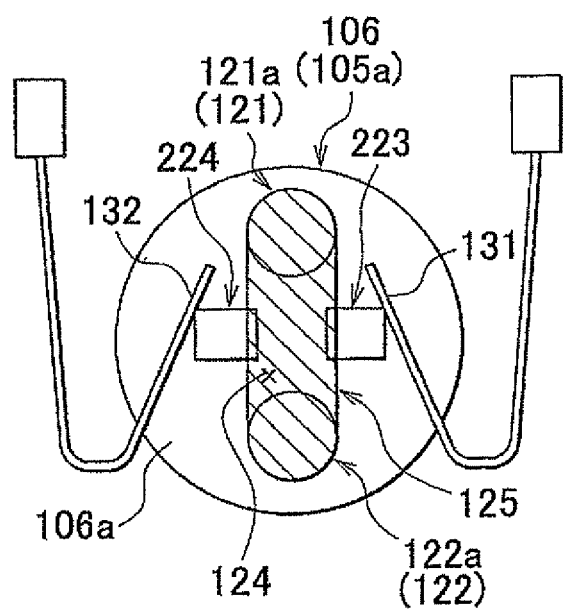
FIG. 6 is a schematic view of the first conductive element 121 and second conductive element 122 when de-energized, and the dividers 223 and 224 are used instead of the divider 123.

A second embodiment of the invention, in which is the divider 123 according to the first embodiment has been modified, is illustrated in FIG. 5 and FIG. 6. FIG. 5 schematically shows the energized state of the first conductive element 121 and second conductive element 122 when dividers 223 and 234 according to the second embodiment are used. FIG. 6 schematically shows the de-energized state of the first conductive element 121 and second conductive element 122 when the dividers 223 and 234 according to the second embodiment are used.

As shown in FIG. 5, the divider 223 corresponds to the contact portion 123a of the above-described divider 123. In addition, the divider 224 corresponds to the contact portion 123b of the above-described divider 123. The dividers 223 and 234 each have a rectangular (square) cross-sectional shape and are made of a non-conductive material. In addition, the dividers 223 and 234 are interposed in a region between the first ends 121a and 122a of the first conductive element 121 and second conductive element 122, and each have at least a portion located outside the partition region 125. Then, when the relative position between the two first ends 121a and 122a and the two terminals 131 and 132 is set as shown in FIG. 6, these dividers 223 and 234 respectively contact the terminals 131 and 132. This prevents contact between the first ends 121a and 122a and the terminals 131 and 132 in the de-energized state. That is, these dividers 223 and 234 function as contact inhibiting portions inhibiting contact between the first ends 121a and 122a and the terminals 131 and 132. Thus, the dividers 223 and 234 have similar functions and advantageous effects to those of the above-described divider 123. In the second embodiment, the dividers 223 and 234 both function as contact portions contacting with the terminals 131 and 132 when de-energized. The contact portions of the dividers 223 and 234 are located outside the partition region 125 in the direction that intersects with the direction in which the first ends 121a and 122a are arranged.

In the example shown in FIG. 5 and FIG. 6, both of the dividers 223 and 234 partially overlap with the partition region 125. However, both dividers 223 and 234 may instead be arranged outside the partition region 125. Furthermore, where necessary, the dividers 223 and 234 each may be a rod having, for example, a triangular, polygonal, circular, or elliptical cross section.

In addition, in the above embodiments, the first ends 121a and 122a of the first conductive element 121 and second conductive element 122 are provided at the end surface 106a of the shaft end 106 of the support shaft 105; however, the first ends 121a and 122a may alternatively be provided at the outer peripheral surface of the shaft end 106 of the support shaft 105.

While the invention has been described in conjunction with specific embodiments thereof, it should be noted that suitable alterations, modifications, and variations will be apparent to those skilled in the art. Accordingly, example embodiments of the disclosure as set forth herein are intended to be illustrative, not limiting. The invention may be suitably modified without departing from the scope of the disclosure.

What is claimed is:

1. A vehicle sun visor comprising:
    a sun visor body;
    a non-conductive support shaft that supports the sun visor body;
    a mounting bracket that attaches the support shaft to a vehicle;
    a first conductive element and a second conductive element that are provided at a shaft end of the support shaft adjacent to the mounting bracket and inside the support shaft, wherein the first conductive element and the second conductive element extend along the support shaft, wherein a first end of the first conductive element protrudes from the shaft end of the support shaft, a first end of the second conductive element protrudes from the shaft end of the support shaft, and the first ends of the first conductive element and the second conductive element are spaced apart from each other and extend in the same direction in which the support shaft extends;
    a non-conductive divider that is interposed between the first ends of the first conductive element and the second conductive element; and
    a pair of terminals that supply electric power to the first ends of the first conductive element and the second conductive element, wherein
    a gap is formed between the divider and at least one of the first end of the first conductive element and the first end of the second conductive element,
    the support shaft includes a first segment and a second segment,
    the first segment is rotatably mounted in the mounting bracket, and
    the second segment of the support shaft is rotatable around the an axis of the first segment,
    when the first segment of the support shaft is rotated to a first position, the first end of the first conductive element and the first end of the second conductive element each contact a corresponding terminal, and
    when the first segment of the support shaft is rotated to a second position, the divider contacts the terminals so as to inhibit contact between the first end of the first conductive element and one of the terminals and contact between the first end of the second conductive element and the other one of the terminals.

2. The vehicle sun visor according to claim 1, wherein
    the first ends of the first conductive element and the second conductive element extend from an end surface of the shaft end in the direction in which the first segment of the support shaft extends, and
    the divider extends from the end surface of the shaft end in the direction in which the first segment of the support shaft extends.

3. The vehicle sun visor according to claim 1, wherein
    the first ends of the first conductive element and the second conductive element extend so as to be parallel to each other.

4. The vehicle sun visor according to claim 1, wherein
    the divider is a plate or a rod.

5. The vehicle sun visor according to claim 1, wherein
    a length of a partition region is larger than a length of the divider, and
    the partition region is an obround region in which the first ends of the first conductive element and the second conductive element form the ends of the obround region.

6. The vehicle sun visor according to claim 1, wherein
    the divider includes a pair of contact portions,
    the contact portions are located outside a partition region, and
    the partition region is an obround region in which the first ends of the first conductive element and the second conductive element form the ends of the obround region.

* * * * *